(No Model.)
C. E. BUCKBEE.
PNEUMATIC TIRE AND METHOD OF REPAIRING SAME.
No. 606,271. Patented June 28, 1898.
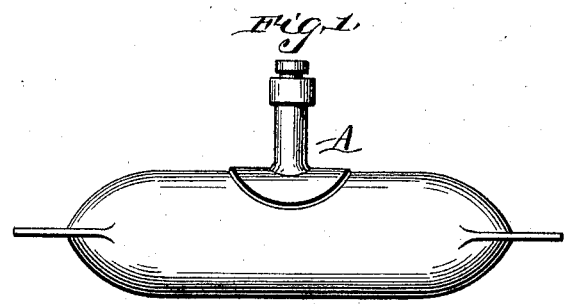
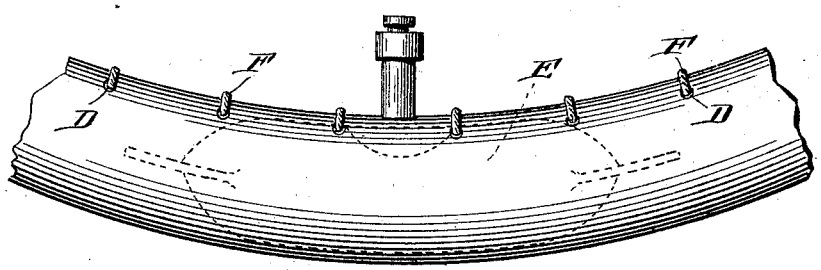
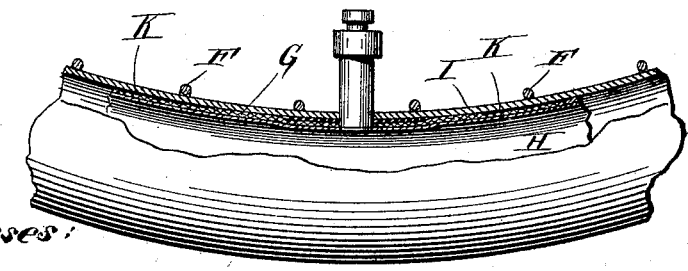
Witnesses:
A. E. Ball
Inventor:
Charles E. Buckbee

UNITED STATES PATENT OFFICE.

CHARLES E. BUCKBEE, OF FLUSHING, MICHIGAN.

PNEUMATIC TIRE AND METHOD OF REPAIRING SAME.

SPECIFICATION forming part of Letters Patent No. 606,271, dated June 28, 1898.

Application filed July 3, 1897. Serial No. 643,473. (No model.)

*To all whom it may concern:*

Be it known that I, CHARLES E. BUCKBEE, a citizen of the United States, residing at Flushing, in the county of Genesee and State of Michigan, have invented an Improved Single-Tube Pneumatic Tire and Method of Repairing Same, of which the following is a specification.

My invention relates to that part of the single-tube tire in which the valve for inflating is situated, extending in either direction from the valve from four to eight inches, and including the valve-tube; and the objects of my improvement are, first, to construct the tire in a manner that allows the easy and quick repair of the tire when the valve-tube is broken; secondly, to afford a means of easily and quickly repairing the tire when the valve-tube becomes injured or broken off. I attain these objects by the device and method illustrated in the accompanying drawings, in which—

Figure 1 represents a longitudinal view of the device used, which consists of a section of thin rubber tubing of a diameter when inflated to correspond with the internal surface of the tire, four to eight inches in length, closed at both ends, with a valve-tube in or near the center, (shown at A.) Fig. 2 shows a longitudinal cut of ordinary single-tube tire with a slit B cut in its inner circumference in either direction from the valve-opening C to the extent of from two to four inches, with eyelet-holes punched about one-fourth of an inch from the free margins of the slit and extending parallel with them, D. Fig. 3 shows longitudinal cut of single-tube tire with the inflated section of thin rubber tubing, with valve attached (denoted by dotted lines E) within its lumen and held in place by a thread or twine lacing F, passed through the eyelet-holes, and by cementing process, to be described. Fig. 4 shows longitudinal section of single-tube tire with device in place, with a piece of canvas G inserted between the surfaces of the thin rubber tubing H and external tube I, and with the ends of the inner tube ruptured, J, and the surface of the inner tube united to the internal surface of the outer tube by cement K.

In the following description of the method of application of my invention similar letters refer to similar parts in the accompanying drawings.

In the application of my invention an ordinary valve is fitted into the valve-tube shown at A, Fig. 1. The section of thin rubber tubing containing the valve-tube, Fig. 1, is moderately inflated. The interior of the tire is then smeared with cement through the slit shown at B, Fig. 2, for a distance extending one or two inches beyond the ends of the opening, and the surface of the thin rubber tubing, closed at both ends, either by process of manufacture or by cementing, and containing the valve-tube, shown at Fig. 1, is immediately smeared with cement over its surface, to the extent of two inches from either end, and quickly inserted through the slit B, Fig. 2, into the tire in such a manner that the cement-covered surfaces of the thin tubing shall come in contact with the cement-covered surface of the interior of the tire, fitting the valve-tube A, Fig. 1, into the valve-opening in the tire C, Fig. 2. Slight inflation of the inner tube is made by means of an air-pump for the purpose of pressing the cement-covered surfaces closely together, and the tire is allowed to stand for fifteen minutes in order that the cement may set firmly. After the cement has set firmly a small piece of canvas G, Fig. 4, with a hole in its center for the passage of the valve-tube, is inserted between the inner thin tube H, Fig. 4, and external tire I, Fig. 4, for the purpose of preventing possible chafing by the stout twine which should now be passed through the eyelet-holes D, Fig. 2, and firmly laced. When the device, Fig. 1, has been placed in position, as above described, the air-pump is again attached to the valve and forced inflation made, when the ends of the inner tube of thin rubber will rupture J, Fig. 4, and as the inner tube is held firmly in place by the cemented surfaces, as before described and as shown at K, Fig. 4, the entire tire is inflated as under ordinary circumstances and is ready for cementing to the rim.

The method of repairing the tire when the valve-tube becomes broken or injured is identical in every respect with the method above described after the broken valve-tube has been removed.

What I claim, and desire to secure by Letters Patent in the United States, is—

1. The improved method of manufacturing and repairing single-tube pneumatic tires which consists of making an opening from two to four inches in either direction from the valve-opening as seen in ordinary single-tube tires; punching a row of eyelet-holes on either side of the opening thus made; inserting the device of thin rubber tubing with valve-tube A attached, through the opening above mentioned; securing it in place by cement, and lacing passed through the eyelet-holes, after protecting the inner tube by a piece of canvas as substantially set forth.

2. A device, consisting of an inflatable tube with sealed ends with valve-tube attached at its center, adapted to be inserted through an opening, existing in the improved tire above described, or in case of ordinary tires an opening made to allow of its insertion into the lumen of the tire and means for its forced inflation and retention after being inserted into the tire as substantially set forth, for the purpose of quickly and easily repairing a single-tube pneumatic tire when the valve-tube becomes injured or broken off.

CHARLES E. BUCKBEE.

Witnesses:
C. S. WHEELER,
A. E. BALL.